May 1, 1962     C. A. REXINE     3,032,126
ICE AUGER
Filed Oct. 21, 1958     2 Sheets-Sheet 1
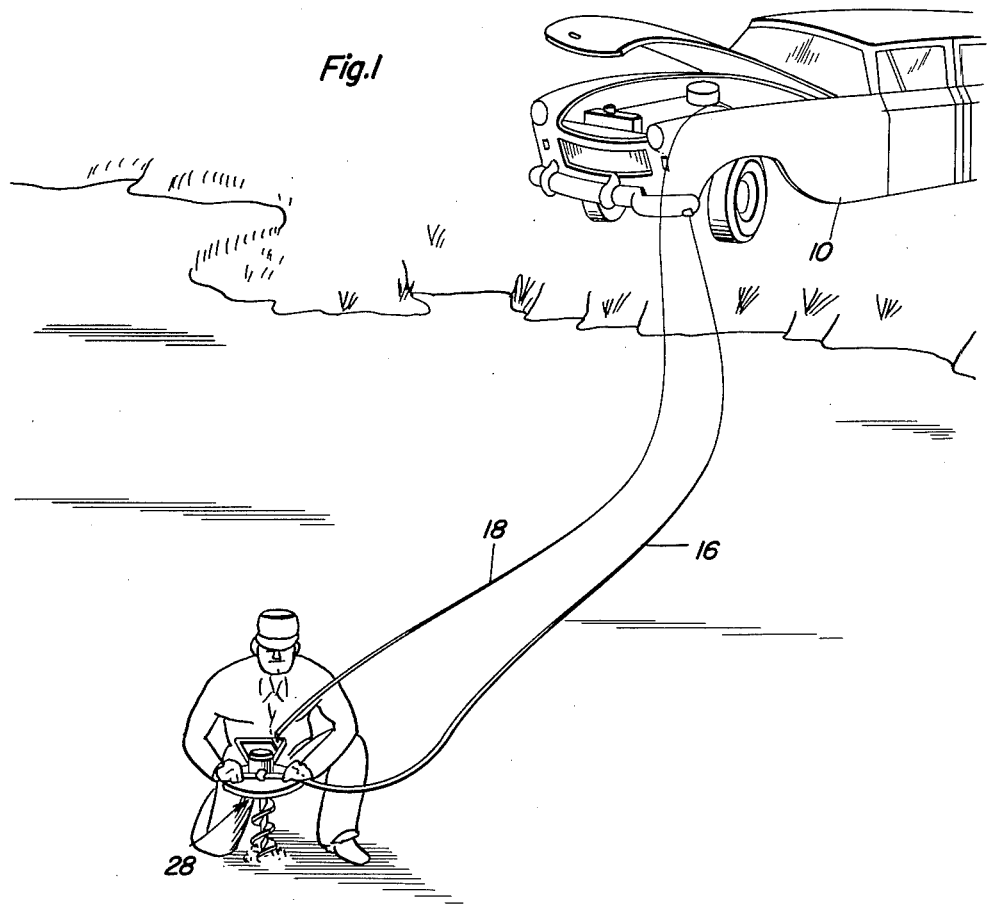
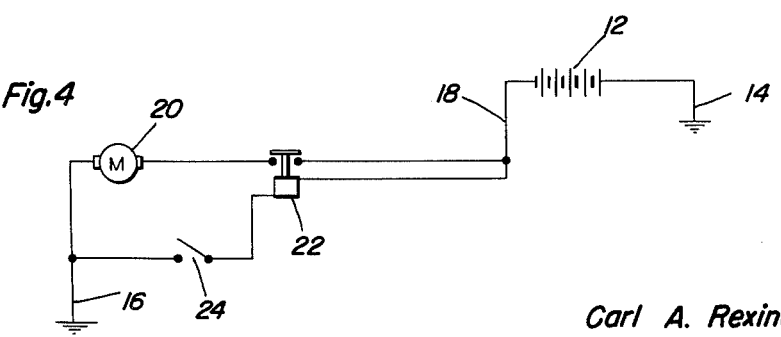
Carl A. Rexine
INVENTOR.

May 1, 1962 C. A. REXINE 3,032,126
ICE AUGER
Filed Oct. 21, 1958 2 Sheets-Sheet 2
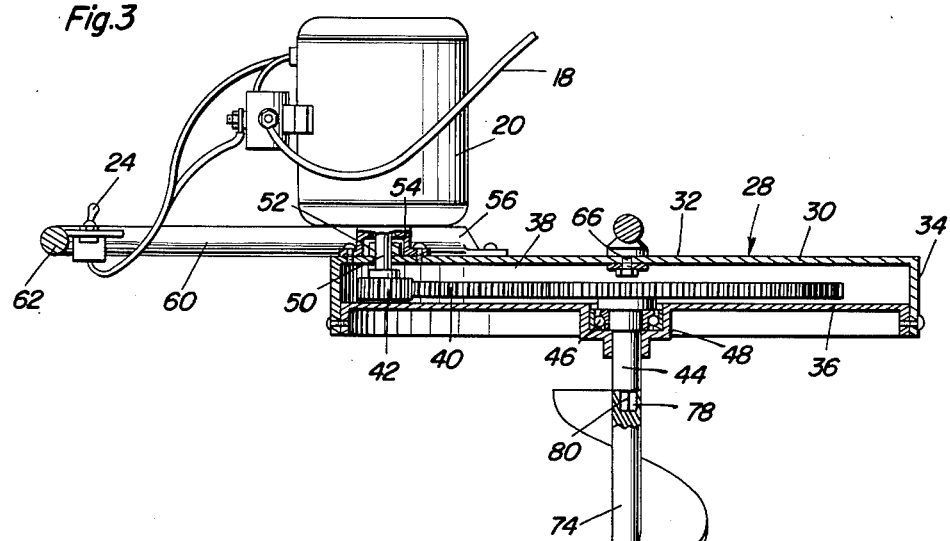
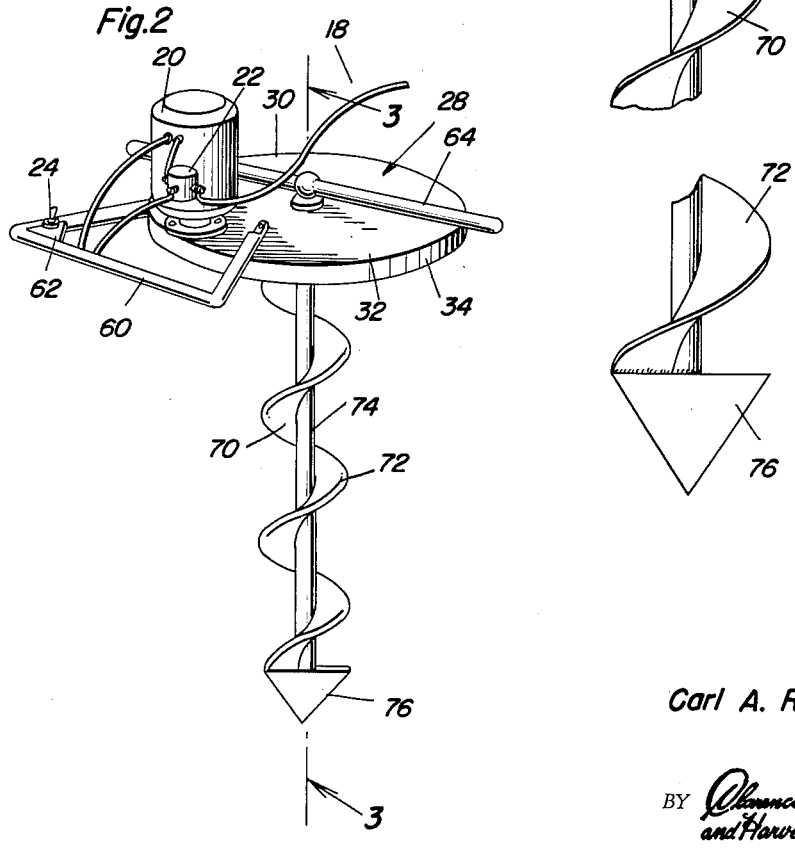
Carl A. Rexine
INVENTOR.

United States Patent Office 3,032,126
Patented May 1, 1962

3,032,126
ICE AUGER
Carl A. Rexine, Bowdon, N. Dak.
Filed Oct. 21, 1958, Ser. No. 768,744
4 Claims. (Cl. 175—18)

This invention relates to an ice auger and more particularly to an ice auger capable of functioning from electric power available in a motor car.

An object of the invention is to provide a D.C. operated ice auger operable from the available electrical energy in the ordinary motor vehicle electrical system, the ice auger being light in weight and easily carried.

Another object of the invention is to provide an ice auger wherein there is an electric D.C. motor adapted to be operated from a low voltage source, for example the electrical system of a motor vehicle, a power transmission having reduction gearing by which to rotate a spindle that separably carries an auger blade. Accordingly the auger blade may be disconnected from the drive spindle whereby the ice auger is easily stored, for instance in the trunk compartment of a motor vehicle or on the back seat or some other convenient place.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the ice auger in use.
FIGURE 2 is a perspective view of the auger.
FIGURE 3 is a sectional view taken approximately on the line 3—3 of FIGURE 2.
FIGURE 4 is a wiring diagram.

In the accompanying drawings there is a motor vehicle 10 which diagrammatically represents any type of automobile, station wagon, truck or any other vehicle that has available a source of electrical potential. In FIGURE 4 this source is shown at battery 12 connected to ground 14 in the motor vehicle.

A ground cable 16 which may be provided at one end with an alligator clip or some other clamp, is adapted to be attached to a conductive part of the motor vehicle, e.g. the front bumper. Cable 18 is also fitted with an alligator clip or some other type of clamp and is adapted to be secured to the positive side of the battery 12 or another hot terminal in the electrical system of the motor vehicle. The cables 16 and 18 are operatively connected with motor 20 in order to energize the motor. This is the simplest electrical system. If desired, a relay type electrical system may be used, for instance by employing a solenoid switch 22 in the circuit. In such case a low capacity toggle switch 24 may be connected in series with the coil of the solenoid switch 22 so that a light current load is drawn through the solenoid coil and yet, the switch section of the solenoid switch 22 will control the heavier amperage current required to energize motor 20. The solenoid 22 may be an ordinary automotive type solenoid, and motor 20 may be a special motor or a commercially available motor capable of operating on six or twelve volts D.C. current inasmuch as our present motor vehicles are equipped with both six and twelve volt systems depending on the age of the motor vehicle.

Ice auger 28 is composed of a lightweight casing 30 having a top wall 32 and a depending cylindrical skirt 34 at its periphery. Bottom wall 36 extends transversely across wall 34 and is spaced from wall 32 a distance sufficient to accommodate transmission 38. The transmission consists of a gear 40 and pinion 42 that is engaged with it. The gear 40 is secured to the inner end of the drive spindle 44, the latter mounted for rotation in anti-friction bearing 46. The bearing is in a bearing cage 48 attached to or formed integral with the center of wall 36 and having provision for the lower part of spindle 44 to pass freely through it. Pinion 42 is secured to the shaft 50 of motor 20, and the shaft 50 is passed through bearing 52 carried by bearing cage 54 on wall 32.

Motor 20 has a motor bearing bracket 56 that is riveted, bolted or otherwise secured to wall 32 of casing 30 and preferably near the edge thereof. An approximately U-shaped handle 60 has a pair of sides which are secured at their inner ends, for instance by being riveted, to wall 32 and on opposite sides of motor 20. Switch 24 is mounted on a plate 62 that is secured at a corner of handle 60 so that it is accessible to the user of the ice auger. Transverse bar 64 is secured by a bolt 66 to the center of wall 32 and cooperates with handle 60 to aid the fisherman in using the auger, FIGURE 1.

The auger blade 70 has a screw thread 72 on its shank 74 and a point 76 at its lower extremity. The non-circular socket 78 is in the upper end of shank 74 and is separably engageable with a similarly shaped stud 80 at the lower extremity of spindle 44.

In use, the motor 20 is energized by closing switch 24. This draws current from the electrical system of the motor vehicle causing pinion 42 to be rotated. The pinion rotates gear 40 at a considerably lower speed but with greater power. Since the auger blade 70 is secured to drive spindle 44, and the drive spindle is fixed to gear 40, the auger blade will rotate in response to operation of motor 20.

In using the electrical ice auger it requires only a brief period to cut through ice of considerable thickness. Thereafter the fisherman may replace the ice auger in his motor vehicle and proceed to fish.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An ice auger for ice fishing comprising a hollow casing having an upper wall provided with a depending side wall and a lower wall spaced from said upper wall and cooperating with said upper and side walls and defining a flat gear accommodating chamber therebetween, said upper wall being planar and having an eccentrically positioned upwardly opening aperture near one edge of said wall, a low voltage electric motor provided with a power shaft, a first bearing cage connected to said motor and secured to said upper wall and thereby mounting said motor on said casing in a position at which the motor is fully exposed and extends upwardly from the casing exterior, said power shaft extending through said aperture and into said flat chamber, said lower wall having an aperture at approximately the axial center thereof, a second bearing cage surrounding and aligned with said aperture, a drive spindle in said last named bearing cage and protruding outwardly of said aperture, a flat gear connected to said drive spindle and located in said chamber, a drive pinion in said chamber and secured to said power shaft and enmeshed with said gear to drive said spindle from the power of the motor shaft, an auger member separably connected to said spindle and arranged at approximately right angles atop said upper wall and a carrying handle secured to said casing and projecting in part outwardly from the edge of the casing adjacent to which said motor is mounted.

2. The auger of claim 1 wherein said handle is essentially U-shaped in plan with the lateral arms thereof straddling said electric motor and secured to said upper wall on opposite sides of said motor the bight portion of said handle being spaced a distance from the adjacent marginal portion of the casing that it may be utilized, when the auger is operating, as a body rest and stabilizing brace.

3. The auger of claim 2 wherein there is a second handle, the latter comprising a straight bar secured atop said upper wall and having end portions extending outwardly beyond diametrically opposite marginal edge portions of said casing to provide hand grips for the auger.

4. For use by a fisherman when drilling a desired fishing hole in a slab of ice; a portable device comprising a hollow casing circular in plan and embodying aligned spaced parallel upper and lower walls connected by telescoping separably connected endless marginal walls, a motion delivering spindle mounted for rotation in bearing means provided therefor at the center of the lower casing wall, a speed reducing and motion transmitting gear enclosed in the chamber portion of said casing and secured centrally to the spindle, an auger provided at a leading end with an ice penetrating and drilling point and operatively connected at an upper end with said spindle, an exposed electric motor embodying a housing of a cross-section appreciably less than the diameter of the upper wall of said casing, said motor being eccentrically located and confined to a marginal sector of a predetermined side of the casing and having a shaft journaled in a bearing provided therefor in the upper wall with said shaft carrying a pinion enmeshed with said gear, a linearly straight bar superimposed upon and having a central portion thereof fixed to an axial portion of the upper wall of the casing and having end portions projecting beyond diametrically opposite marginal portions of said casing and constituting accessible easy-to-hold handgrips, and a carrying handle U-shaped in plan having a bight portion and lateral arms, said arms radiating beyond a cooperating marginal portion of the casing and having inner ends straddling the motor and fastened accessibly atop the upper wall, said bight portion being located outwardly and beyond the marginal portion of the casing and constituting a stabilizing and handling brace, that is, when the motor is in operation.

References Cited in the file of this patent

UNITED STATES PATENTS

| | | |
|---|---|---|
| 2,107,958 | Pribyl | Feb. 8, 1938 |
| 2,250,671 | Joy | July 29, 1941 |
| 2,480,372 | Kandle | Aug. 30, 1949 |
| 2,562,276 | Kandle | July 31, 1951 |
| 2,568,959 | Illies | Sept. 25, 1951 |
| 2,914,305 | Wink | Nov. 24, 1959 |
| 2,975,848 | Roberts | Mar. 21, 1961 |